US012026485B2

(12) United States Patent
Mair

(10) Patent No.: US 12,026,485 B2
(45) Date of Patent: Jul. 2, 2024

(54) METHOD FOR GENERATING SOURCE CODE

(71) Applicant: dSPACE GmbH, Paderborn (DE)

(72) Inventor: Michael Mair, Paderborn (DE)

(73) Assignee: DSPACE GMBH, Paderborn (DE)

( * ) Notice: Subject to any disclaimer, the term of this patent is extended or adjusted under 35 U.S.C. 154(b) by 85 days.

(21) Appl. No.: 17/940,036

(22) Filed: Sep. 8, 2022

(65) Prior Publication Data
US 2023/0229403 A1 Jul. 20, 2023

(30) Foreign Application Priority Data

Sep. 10, 2021 (DE) .......................... 102021123501.4

(51) Int. Cl.
*G06F 8/41* (2018.01)
*G06F 8/35* (2018.01)
(52) U.S. Cl.
CPC ...................................... *G06F 8/35* (2013.01)
(58) Field of Classification Search
CPC ....................................................... G06F 8/41
See application file for complete search history.

(56) References Cited

U.S. PATENT DOCUMENTS

| 6,369,836 | B1 * | 4/2002 | Larson | ...................... | G06F 8/34 |
| | | | | | 715/965 |
| 10,078,500 | B2 | 9/2018 | Moors et al. | | |
| 10,884,715 | B2 | 1/2021 | Mair et al. | | |
| 2004/0039746 | A1 * | 2/2004 | Bracha | ..................... | G06F 9/526 |
| 2005/0166167 | A1 * | 7/2005 | Ivancic | ............... | G06F 11/3608 |
| | | | | | 703/22 |
| 2011/0271259 | A1 * | 11/2011 | Moench | .................. | G06F 8/443 |
| | | | | | 717/124 |
| 2012/0284689 | A1 * | 11/2012 | Armstrong | ................ | G06F 8/33 |
| | | | | | 717/113 |

FOREIGN PATENT DOCUMENTS

| EP | 2418577 A1 | 2/2012 |
| EP | 3438817 A1 | 2/2019 |

* cited by examiner

*Primary Examiner* — Jae U Jeon
(74) *Attorney, Agent, or Firm* — LEYDIG, VOIT & MAYER, LTD.

(57) ABSTRACT

A method for generating source code from one or more blocks of a block diagram that comprises at least two non-virtual blocks and at least one signal link between two non-virtual blocks includes: transforming the block diagram into an intermediate representation, wherein transforming the block diagram into the intermediate representation comprises transforming a first block having access to a multi-component variable; successively optimizing the intermediate representation; and translating the optimized intermediate representation into source code. Transforming the first block comprises: testing whether a block pair made up of the first block and an adjacent block comprises an equal assignment; and removing any assignments in which a reference to the same variable exists on both sides.

14 Claims, 4 Drawing Sheets

METHOD FOR GENERATING SOURCE CODE

CROSS-REFERENCE TO PRIOR APPLICATIONS

This application claims benefit to German Patent Application No. DE 102021123501.4, filed on Sep. 10, 2021, which is hereby incorporated by reference herein.

FIELD

The invention relates to generating executable code from a block diagram, in particular for programming control units.

BACKGROUND

Control devices are used in many different applications in order to record physical variables of a process and/or influence a process using connected actuators, for example an anti-lock control in a braking operation. The time constants determining the dynamic behavior of the process often require cycle times of 1 ms or less, so the control unit must have real-time capabilities. For reasons of cost, control units often include microcontrollers having a small memory and limited computing power, which is why the size and efficiency of the executable code is very important.

To design control units more quickly, control strategies are often developed on the basis of models in a computing environment such as MATLAB/Simulink. Therefore, the process and/or the controller, or the behavior of the control unit in general, can be simulated first and it can be checked whether desired properties are present. In particular, the models may be block diagrams comprising blocks that execute operations such as calculations; by way of example, a block may calculate one output signal from a plurality of input signals. In general, block diagrams are executed cyclically, with all blocks being permanently retained in the memory and each block being executed once per time step. In particular, in each time step a block may apply one or more operations to input signals from the parent block in order to generate output signals for the current step. Block diagrams may additionally comprise a sub-model for describing a discrete behavior in which a number of states and transition conditions are defined. Source code for programming the control unit can be generated from the models using a code generator. A code generator for generating source code in production quality is known, for example, from the document "Production Quality Code Generation from Simulink Block Diagrams", Proceedings of the 1999 International Symposium on Computer Aided Control System Design, Kohala Coast, Hawaii, H. Hanselmann et al.

If models are described in the form of a block diagram, with blocks being linked to exchange data or relay signals via directional links or signal links, a normal code generation approach involves generating one variable in the source code for each output of a block. However, the drawback of this is that generally more block variables than are actually needed are initially produced in the process. The number of block variables, or the code size in general, can be reduced by subsequent optimization. For instance, EP 2418577 A1 discloses transforming a block diagram into an intermediate representation and applying at least one optimization to said intermediate representation in order to generate an optimized intermediate representation. Many different further optimizations known per se from compiler construction can be successively applied in order to generate intermediate representations that are optimized further. Next, C code in particular is generated from the optimized intermediate representation.

Since each optimization results in a different intermediate representation, the degree to which the code is optimized overall may depend on the order of the optimization steps. For instance, a function call located between two processing blocks and about which no further information is locally available may render an optimization impossible. In the case of multi-component variables, optimization weaknesses of this kind are particularly pronounced since even simple copying may be accompanied by high memory consumption and a considerable execution time. For example, a vector or matrix, as an assignment of the variables as a whole, may be copied via either assignments in loops or elemental assignments, so an operation that is the same per se may not always be discernible as such in the intermediate representation.

For the case of writing to a special medium, in particular a flash memory having a limited number of possible writing operations, U.S. Ser. No. 10/078,500 B2 proposes testing whether, owing to an assignment operation, a block group results in a value change only for portions of a multi-component variable, and then generating writing instructions only for the individual elements affected. In other words, a special block group is identified, and the generated code is modified in line with that configuration. However, this may result in increased storage requirements and a longer execution time than is actually needed for a multiplicity of block groups or operations that are not covered by this special schema.

SUMMARY

In an exemplary embodiment, the present invention provides a method for generating source code from one or more blocks of a block diagram that comprises at least two non-virtual blocks and at least one signal link between two non-virtual blocks. The method includes: transforming the block diagram into an intermediate representation, wherein transforming the block diagram into the intermediate representation comprises transforming a first block having access to a multi-component variable; successively optimizing the intermediate representation; and translating the optimized intermediate representation into source code. Transforming the first block comprises: testing whether a block pair made up of the first block and an adjacent block comprises an equal assignment, wherein the block pair is composed of either the first block and its parent or the first block and its child, wherein an equal assignment is present when a portion of the multi-component variable of one block of the block pair is copied in unchanged form into one portion of the multi-component variable of the other block of the block pair, and wherein either a reference to a portion of an output variable of the first block is replaced with a reference to a corresponding portion of a data store variable, or a reference to a portion of an output variable of the parent block of the first block is replaced with a reference to a corresponding portion of a variable of the first block; and removing any assignments in which a reference to the same variable exists on both sides.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
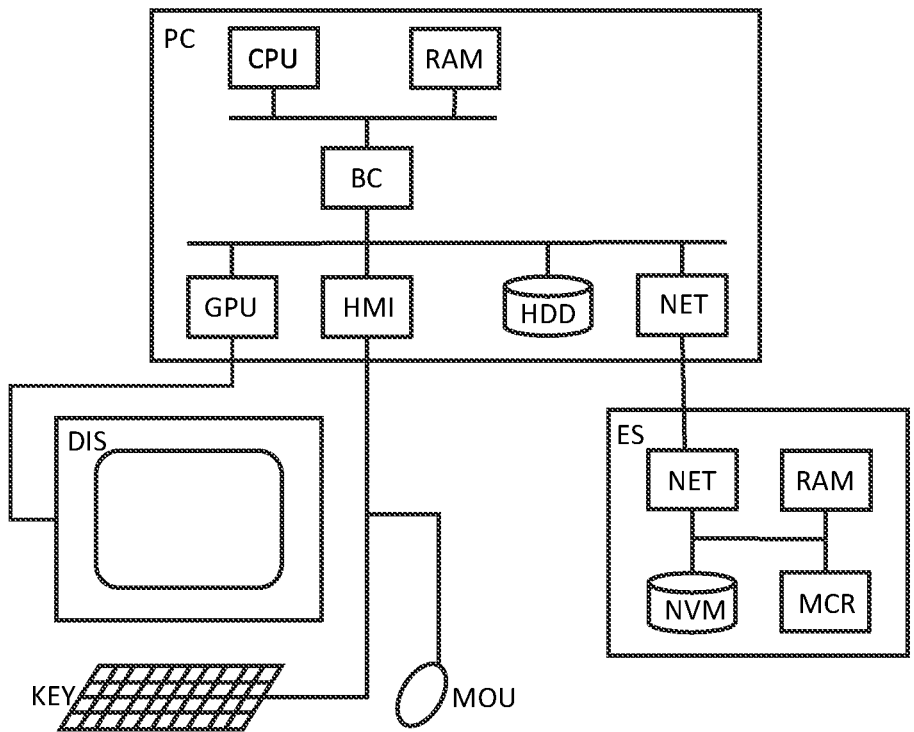
FIG. 1 shows a preferred embodiment of a computer system.

Exemplary embodiments of the present invention aid the generation of more compact source code while avoiding undesirable side effects.

A method is thus provided for generating source code from one or more blocks of a block diagram that comprises at least two non-virtual blocks and at least one signal link between two non-virtual blocks, wherein generating source code comprises transforming the block diagram into an intermediate representation, successively optimizing the intermediate representation, and translating the optimized intermediate representation into source code, wherein transforming a non-virtual block comprises creating a reference to a block output variable. According to the invention, for a first block having an access to a multi-component variable, transforming comprises testing whether a block pair made up of said block and an adjacent block comprises an equal assignment, wherein the block pair is composed of either the first block and its parent or the first block and its child, and wherein an equal assignment is present when at least one portion of the multi-component variable of one block of the block pair is copied in unchanged form into a portion of the multi-component variable of the other block of the block pair. When an equal assignment is present, variable references are replaced, wherein either a reference to the portion of the variable of the upstream block of the block pair is replaced with a reference to the corresponding portion of the variable of the subsequent block of the block pair, or the reference to an output variable of the first block is replaced with the reference to a data store variable. In addition, transforming comprises removing any assignments in which a reference to the same variable exists on both sides.

Data or signals can be transmitted via a signal link; in this case, a first block outputs a value or, depending on the definition, a plurality of associated values, and a second block receives it/them and takes it/them into account when determining one or more associated readout values of the second block. Signals may be scalar variables and/or structured data types such as arrays, as is the case with a bus for example. If a block comprises the access to a multi-component variable, omitting these variables can allow for a considerable reduction in storage space and execution time, for example since instructions for copying the individual components or elements of the variables are not generated in the code and therefore need not be executed during runtime either. The multi-component variable may be a vector comprising a multiplicity of variables of the same data type, a matrix comprising a multiplicity of vectors, a structure comprising a multiplicity of variables of any data type, or a vector or matrix of structures.

The transforming step may include a plurality of sub-steps, such as checking a number of rules and appending further code generation information. In principle, the optimization according to an embodiment of the invention may be carried out in any intermediate step of the transformation. In the intermediate representation, the blocks are translated into instructions having a fixed order of execution, as a result of which the structure semantically maps a textual programming language (similar to C code). The variables copied in unchanged form may also be a constant.

A "virtual block" should be understood as a block that is used only for structuring the block diagram but has no direct influence on the simulation. By way of example, Mux or Demux blocks, which merge a plurality of signals into a virtual vector or extract an element signal of a virtual vector, are virtual blocks. Processing blocks, which calculate an output value and/or perform an assignment on at least portions of a signal, are non-virtual blocks. The reference to a block may in particular be a name of the block. Block variables may be explicitly defined in the block or be automatically generated, for example on the basis of a signal link, in which a block variable, i.e., a block output variable, is expediently generated for an output signal of a block. The identifier or name of block variables may be permanently specified or defined on the basis of generation specifications. For instance, the identifier of a block output variable may comprise the name of the block and/or the name of the port in the block from which the signal originates. Since, according to the invention, the signal flow is followed in the block diagram and variable names of an intermediate representation are not merely compared, an optimization is possible regardless of naming conventions or generation specifications.

Advantageously, the method according to an embodiment of the invention identifies different block pairs or block groups and block variables that lead to equal assignments, and in each case overwrites one of the variables of the identified block pair in order to prompt assignments between the same variable, or the same variable portions, that then need not be applied at all when generating the intermediate representation, or in order to assign the same value to the same variable so that at least one of the variables is omitted. As a result, not only is more efficient code generated overall, but also the optimization on the intermediate representation is sped up since fewer variables or code patterns have to be considered right from the outset.

Preferably, one or more of the following types of blocks are tested for an equal assignment:
  a Data Store Read block, which reads from a data store variable,
  a Data Store Write block, which writes to a data store variable,
  a switch block, which selectively links an output to one of a plurality of inputs,
  a bus output block, which models a readout to a bus,
  an outport block, which models a readout, and/or
  a delay block, which outputs an input signal again after a delay of one time step.

Preferably, in the case of a Data Store Read block, this block is considered together with the subsequent block, and if an equal assignment is present, a reference to an output variable of the Data Store Read block is replaced with a reference to the corresponding portion of the data store variable, and/or, in the case of a Data Store Write block, switch block, bus outport block, outport block, and/or delay block, this block is considered together with the parent block, and if an equal assignment is present, a reference to an output variable of the parent block is replaced with a reference to a variable of the first block. An output of the parent block is directly linked to an input of the subsequent block via a signal. The (block) output variable of the Data Store Read block may be a buffer variable or the data store variable or the Data Store Memory variable. Expediently, a Data Store Write block replaces a (block) output variable of the parent block with the data store variable or the corresponding portion of the data store variable.

An equal assignment allowing for an optimization is thus identified on the basis of block properties. An optimization according to the invention is simple even for complex signals or multi-component block variables and can be carried out in the same way regardless of the number of components. In this case, only a few rules relating to a small number of blocks and signals connected thereto have to be checked. It is thus possible to detect the correctness of the sub-steps in a simple manner and to ensure that the same modeling also leads to equally efficient code.

If a block diagram comprises a multiplicity of blocks whose block type corresponds to a block type that is to be tested for an equal assignment, then, for each block of the multiplicity of blocks, a test for an equal assignment is preferably performed depending on the block type, and variable references are replaced if an equal assignment is present.

Expediently, potential replacement is tested for all the blocks of a suitable type in the block diagram; in particular, for one of the blocks all the possible block pairs out of the block and an adjacent, in particular directly adjacent, block in the signal flow, the presence of an equal assignment is checked and if there is an equal assignment, the corresponding references to variables are replaced. Depending on the type of block, the parent or child block is expediently considered part of the block pair. To determine adjacency relationships, virtual blocks may be skipped.

Preferably, block diagrams are defined hierarchically, wherein a block in a higher plane may comprise a plurality of blocks of a subordinate plane, wherein blocks of a subordinate plane are allocated to a block of a higher plane, and, when a Data Store Read block is tested for an equal assignment, Data Store Write blocks that access the same data store variable are sought in an extensive hierarchical block, in particular an atomic hierarchical block.

Particularly preferably, if a Data Store Read block and a Data Store Write block having access to the same data store variable have been found in the extensive hierarchical block, a check is carried out as to whether the Data Store Read block and the Data Store Write block are linked at least in part in the signal flow such that the portion of the data store variables that is read in the Data Store Read block has a non-empty intersection with the portion of the data store variables that is written in the Data Store Write block, wherein at least one block is located in the signal flow between the Data Store Read block and the Data Store Write block, wherein the interjacent block(s) comprise(s) at least one non-virtual processing block that processes an input variable in order to generate an output variable. As an additional condition, a check is carried out as to whether the interjacent block(s) exhibit(s) such an order of execution that the at least one processing block is executed before the Data Store Write block, and if this additional condition is met, the fraction of the Data Store Read block output variable corresponding to the intersection is replaced with the fraction of the data store variables that corresponds to the intersection.

If the Data Store Read block and the Data Store Write block accessing the same data store variable are not linked in the signal flow, the blocks can be checked for the presence of an equal assignment independently of one another. A signal flow link may only be present if the portion of the data store variables from which reading takes place in the Data Store Read block has a non-empty intersection with the portion of the data store variables to which writing is carried out in the Data Store Write block. The intersection is empty when other components of the variable are accessed, for example other elements of a vector or parallel fractions in the bus hierarchy; for a structure S, for example, S.a would have a non-empty intersection with S.a.b but no intersection with S.c.b. Processing may also be assigning a new value to portions of a variable, so a block that performs a dynamic assignment is also a processing block in this context. If a plurality of Data Store Write blocks access the same data store variable as the Data Store Read block in the extensive hierarchical block, for each of the Data Store Write blocks a check is carried out for the presence of a forward data flow relationship, i.e., that reading from the data store variable is reliably carried out first before any writing to the data store variable. Alternatively, it may also be provided that there need only be a clear sequential order of execution of the blocks accessing the data store variables and the interjacent blocks, i.e., that either reading takes place first or writing takes place first, in order to enable the optimization. The checking of the pre-conditions or additional conditions such as the clear sequential order of execution ensures that the optimization according to an embodiment of the invention does not lead to any undesirable side effects.

If the additional condition is initially not met, then the order of execution of at least one of the interjacent blocks is particularly preferably changed so as to meet the additional condition. If no order of execution is specified for one or more of the blocks either by the modeling itself or by technical circumstances, this provides degrees of freedom for re-sorting the blocks so that the pre-conditions or additional conditions can be met.

Particularly preferably, if a Data Store Read block and a Data Store Write block having access to the same data store variable have been found in the extensive hierarchical block, a check is carried out as to whether the Data Store Read block and the Data Store Write block are linked at least in part in the signal flow such that the portion of the data store variables that is read in the Data Store Read block has a non-empty intersection with the portion of the data store variables that is written in the Data Store Write block, wherein at least one block is located in the signal flow between the Data Store Read block and the Data Store Write block, wherein the interjacent block(s) comprise(s) at least one non-virtual processing block that processes an input variable in order to generate an output variable. In this case, as additional conditions for a parent block of the Data Store Write block, namely the processing block closest to the Data Store Write block in the signal flow, a check is carried out as to whether the fraction of the block output of the parent block corresponding to the intersection is linked to the Data Store Write block without any signal flow branching, and as to whether the block output variable of the parent block coincides, in terms of dimension and data type, with the at least partial link in the signal flow, wherein, if these additional conditions are met, the block output variable of the parent block is replaced with the fraction of the data store variables that corresponds to the intersection.

Preferably, block diagrams are defined hierarchically, wherein a block in a higher plane may comprise a plurality of blocks of a subordinate plane, wherein blocks of a subordinate plane are allocated to a block of a higher plane, and wherein, when a first Data Store Write block is tested for an equal assignment, further Data Store Write blocks that access the same data store variable are sought in an extensive hierarchical block, in particular an atomic hierarchical block, and wherein, as a ground of exclusion for replacing references to variables in the block pair of the first Data Store Write block, a check is carried out for each further Data Store Write block found as to whether it writes to a portion of the data store variables that is also written on by the first Data Store Write block, wherein, if the ground of exclusion is satisfied, a reference to the output variable of the parent block is not replaced with a reference to the portion of the data store variables that is described by the first Data Store Write block, despite an equal assignment being present.

If a plurality of Data Store Write blocks access the same portion of a data store variable, the writing order has to be set and unchangeable to prevent unpredictable side effects; otherwise, the optimization is omitted.

Preferably, variables can be specified as states, wherein, even if an equal assignment is present between a first variable and a second variable of a block pair, a reference to the first variable is replaced with a reference to the second variable only if the first variable is not specified as a state and/or the second variable is specified as a state. Preferably, the second variable can assume the role of a state when it has a static storage duration and an initial value; in that case, for the same initial value, a first variable specified as a state can also be replaced with the second variable.

In particular, a delay block comprises a state variable. Since a state variable influences the output values of the subsequent time step, it should only be replaced with an identical state variable, so as to avoid incorrect behavior.

Preferably, despite an equal assignment being present between a first variable and a second variable of a block pair, a reference to the first variable is not replaced with a reference to the second variable if one or more of the following grounds of exclusion are satisfied, wherein, in the event that there is an equal assignment only for fractions of the first and second variables, only said fractions are also considered in the grounds of exclusion:

The first and second variables have a different dimension.
At least one element in the first variable has a different data type from the corresponding element in the second variable.
The first variable is specified as being necessary.
There is an unpredictable data flow due to signal flow branching and/or the order of execution of the linked blocks.

A variable is specified as being necessary in particular when a user has manually assigned it a particular data type. Owing to the method according to an embodiment of the invention, in particular automatically generated block variables are optimized or omitted. If the first variable and the second variable have the same dimension (i.e., not a different dimension), then they also occupy the same number of storage sites, so the reference to these variables is interchangeable (the same applies to portions of variables). In particular, a section of the elements of the data store variables or of the Data Store Memory can be copied on a Data Store Read block DSR and a linked Data Store Write block DSW, for example an assignment DSR[0 . . . 4]=DSM[3 . . . 7], in which a section of a vector having the dimension 5 is thus copied.

Particularly preferably, block diagrams are defined hierarchically, wherein a block in a higher plane may comprise a plurality of blocks of a subordinate plane, wherein blocks of a subordinate plane are allocated to a block of a higher plane, wherein all the blocks in the plane of the first block and all the blocks allocated to those blocks are checked as to whether a ground of exclusion is satisfied.

The invention further relates to a method for configuring a control unit, wherein the control unit comprises at least one arithmetic logic unit and preferably at least one sensor and/or at least one actuator in order to record data on a physical process and/or influence said process, the method comprising the steps of:
  a. inputting a block diagram,
  b. generating a source code using a method according to the invention,
  c. compiling the source code for the arithmetic logic unit such that an executable code is generated,
  d. transmitting the executable code to the control unit, and
  e. storing the executable code on a non-volatile memory of the control unit and/or executing the executable code by the arithmetic logic unit of the control unit.

The invention further relates to a computer program product comprising a computer-readable storage medium having commands embedded therein which, when executed by a processor, cause the processor to be configured to carry out a method according to the invention.

The invention furthermore relates to a computer system comprising a human-machine interface, a non-volatile memory, and a processor, wherein the processor is configured to carry out a method according to the invention.

The invention will now be described in more detail with reference to the drawings, in which like parts are designated by the same reference signs. The illustrated embodiments are highly schematic, i.e., the distances and the lateral and vertical dimensions are not true to scale and, unless indicated otherwise, do not have any derivable geometric relationships to each other either.

FIG. 1 shows an example configuration of a computer system PC. The computer system has a processor CPU, which may in particular be implemented as a multi-core processor, a main memory RAM, and a bus controller BC. The computer system PC is preferably configured to be manually operated directly by a user, a monitor DIS being connected via a graphics card GPU, and a keyboard KEY and a mouse MOU being connected via a peripheral interface HMI. In principle, the human-machine interface of the computer system PC could also be configured as a touch interface. The computer system further comprises a non-volatile data store HDD, which may in particular be configured as a hard disk and/or solid-state disk, as well as an interface NET, in particular a network interface. A control unit ES may be connected via the interface NET. In principle, one or more interfaces of any type, in particular wired interfaces, may be provided on the computer system PC and may each be used for connecting to a control unit ES. Expediently, a network interface in accordance with the Ethernet standard may be used; the interface NET may also be wireless, in particular configured as a WLAN interface or in accordance with a standard such as Bluetooth.

The control unit ES may be configured as a series control unit or as an evaluation board for a target platform. Expediently, it comprises an interface NET for connecting a microcontroller MCR, having a different architecture from the processor of the computer system, and a main memory RAM and a non-volatile memory NVM to the computer system PC. Where the control unit ES is present, a processor-in-the-loop simulation of the generated code may preferably take place.

Figure 2:
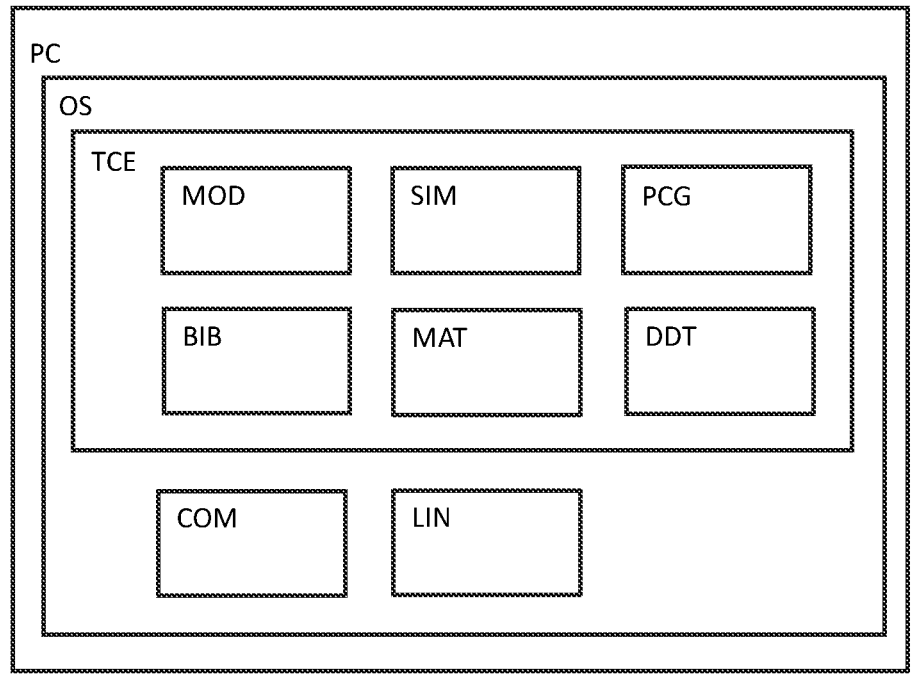
FIG. 2 is a schematic illustration of software components that are preferably present in a computer system.

FIG. 2 shows a diagram of the software components that are preferably installed on the computer system PC. These software components use mechanisms of the operating system OS to, for example, access the non-volatile memory HDD or to establish a connection to an external computer via the network interface NET.

A technical computing environment TCE allows models to be created and source code to be generated from the models. In a modeling environment MOD, models of a dynamic system may be created, preferably via a graphical user interface. In particular, these may be block diagrams comprising a plurality of blocks and describing the behavior over time and/or internal states of a dynamic system. At least some of the blocks are linked via signals, i.e., directional links for exchanging data, which may be scalar or composite. Blocks may be atomic, i.e., may, from the perspective of the surrounding blocks, form a unit in which all the input signals have to be applied at the start of a computing step and all the output signals have to be present at the end of a computing step. If block diagrams are hierarchical, a multiplicity of blocks in a subordinate plane may describe the construction of a block in a superordinate plane. Hierarchical or composite blocks may comprise a multiplicity of blocks in a subordinate plane, even if said blocks are atomic. In particular, composite blocks may be sub-systems; sub-systems may have additional properties, such as implementation in a separate function and/or triggering of the execution of the sub-system via a dedicated signal. Special blocks may be arranged in sub-systems to further specify the properties of the sub-system. The computing environment TCE comprises one or more libraries BIB from which blocks or modules for building a model may be selected. In a script environment MAT, instructions may be input interactively or via a batch file in order to perform calculations or modify the model. The computing environment TCE further comprises a simulation environment SIM that is configured to interpret or execute the block diagram in order to examine the behavior of the system over time. These calculations are preferably carried out using high-precision floating-point numbers on one or more cores of the microprocessor CPU of the computer system.

Preferably, a source code may be generated in a programming language such as C from a created model using a code generator PCG. Additional information on the model, in particular on the block variables, is expediently stored in a definition data pool DDT. Expediently, value ranges and/or scales are allocated to the block variables to assist with the calculation of the model using fixed-point instructions. Desired properties of the source code, for example conformity with a standard such as MISRA, may also be set or stored in the definition data pool DDT. Expediently, each block variable is allocated to a predetermined variable type, and one or more desired properties are set, for example the allowability of optimizations such as merging variables. The code generator PCG preferably analyzes the settings of the definition data pool DDT and takes them into account when generating the source code. The definition data pool DDT may have a tree structure or be stored as a simple file in a memory of the computer system; alternatively, the definition data may be stored in a dedicated database system. The definition data pool may have a program interface and/or import/export functions.

The computer system PC has a compiler COM and a linker LIN, which expediently are configured to generate binary files that can be executed on a control unit ES and/or the computer system PC. In principle, a multiplicity of compilers may be provided, in particular cross-compilers for different target platforms in order to assist control units or evaluation boards ES having different processor architectures.

Figure 3:
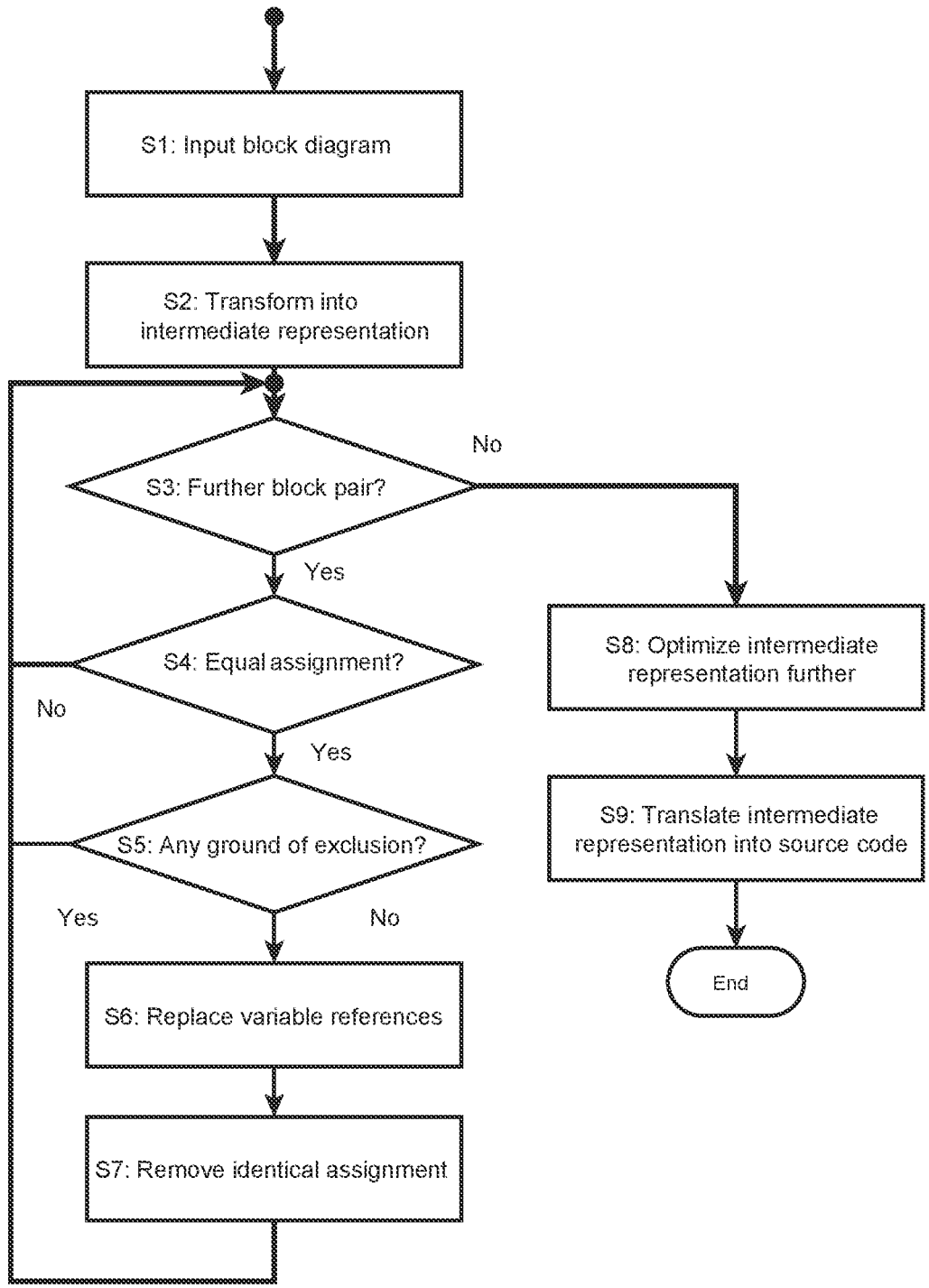
FIG. 3 is a schematic flowchart of an embodiment of a method according to the invention for generating source code.

FIG. 3 is a schematic flowchart of an embodiment of a method according to the invention for generating source code. The method may be executed entirely by a processor of an example embodiment of the computer system PC; however, it may also be intended for execution in a client-server environment having an operator computer and one or more servers linked over a network, in which case computationally intensive steps are in particular carried out on the servers.

In step S1 (Input block diagram), a block diagram is input. The block diagram comprises at least two processing blocks linked by signals and may include a multiplicity of further blocks. Expediently, inputting the block diagram also comprises reading out at least one block property and/or relevant settings for generating the code, for example the data type of a variable, from the definition data pool DDT.

In step S2 (Transform into intermediate representation), the selected model is transformed from one or more blocks of the block diagram into an intermediate representation, which preferably comprises one or more hierarchical graphs. These can in particular be data flow graphs, control flow graphs, or a tree structure. In addition to the block diagram, additional information from a definition data pool DDT is also expediently taken into account when generating the intermediate representation and incorporated therein. This may also include situations in which elements are generated on the basis of information in the data definition pool DDT, or in which properties of elements or relevant settings for generating the code, for example the data type of a variable, are extracted from the definition data pool DDT.

In step S3 (Further block pair?), a check is carried out as to whether the block diagram comprises a further block pair that has not yet been considered and in which an optimization according to the invention is potentially possible. If this is not the case, step S4 is performed next; otherwise the execution continues with step S8.

In step S4 (Equal assignment?), for the current block pair that has not yet been considered, a check is carried out as to whether at least a portion of a variable is assigned to a different variable (or a portion of that variable) without any change in value. If this is the case, step S5 is performed next; otherwise the execution continues with step S3 in order to determine whether a further block pair can be checked.

The invention is based on the consideration that block ensembles, in particular block pairs, and block variables that lead to equal assignments should be identified as early as during the transformation into an intermediate representation within atomic sub-systems. By overwriting block variables and replacing references, assignments between the same variable, or the same variable portions, are prompted and then need not be applied at all when creating the block code, or the same value is assigned to the same variable, generally a state variable, so that at least one of the variables is omitted.

Because the optimization is carried out during the transformation into an intermediate representation, all the information of the block diagram is still available. In particular, therefore, it is possible to take account of the result of block diagram transformations and/or to select or force an order of execution of the blocks that is suitable for the optimization, provided the corresponding degrees of freedom are available. In addition, it is possible to select a suitable order in order to carry out the corresponding replacements multiple times or in the most beneficial way.

In one embodiment of the invention, outputs of blocks that can be considered an atomic unit, in particular therefore atomic systems, may be replaced with the outputs and/or states of subsequent blocks when suitable modeling is available. Expediently, this replacement is carried out before the interior of the atomic system is observed; when testing for grounds of exclusion, the initial value, initialization behavior, and state-reset behavior are preferably taken into account.

In step S5 (Any ground of exclusion?), a test is carried out as to whether a ground of exclusion that makes an optimization according to the invention impossible is satisfied. If this is the case, the execution continues with step S3.

In particular, possible grounds of exclusion for an optimization include the following:
The variables involved differ from one another in terms of dimension widths, data type, and/or scaling.
The block diagram comprises signal line branches due to which the elimination of a variable leads to the loss of a necessary buffer or state.
There is an unrecognized data flow, for example due to a release of variable merging;
a call on external functions;
further Data Store Write blocks and/or Data Store Read blocks without any clear data flow relationship to the blocks currently being observed.
The variable to be eliminated has been specified such that it has to appear in the initial code pattern.

If no grounds of exclusion are satisfied, the execution continues with step S6 (Replace variable references), in which case a reference to a variable reference of an equal assignment is replaced with a reference to the variable of the corresponding neighboring block. Next, in step S7 (Remove identical assignment), any identical assignment prompted by swapping the variable reference is removed from the intermediate representation. The execution then continues with step S3 in order to process any further block pairs present.

In step S8 (Optimize intermediate representation further), the hierarchical graphs are optimized in order to reduce the number of variables required and/or the memory consumption, for example stack occupation, and/or the number of operations or processor instructions and/or the execution time of the source code. This optimization may comprise a multiplicity of intermediate steps in which further intermediate representations are generated between the model/block diagram and source code/program text. In particular, in each intermediate step, a set of original hierarchical graphs may be converted into a different set of changed hierarchical graphs, with one or more optimization rules being applied. Various strategies may be applied during the optimization, such as constant folding or eliminating dead code. In principle, it is possible for a plurality of variables generated during the transformation to be merged in step S8. According to the invention, however, a plurality of variables of the block diagram are preferably merged as early as during the transformation into an intermediate representation, such that the first intermediate representation already contains only one variable.

In step S9 (Translate intermediate representation into source code), the optimized intermediate representation or the optimized hierarchical graphs resulting from the entirety of the intermediate steps carried out are translated into source code of a textual programming language, in particular C code. In this step too, a further optimization may be carried out, in particular such that the generated instructions represent a sub-set of the instructions included in principle by the language and/or the generated control structures represent a sub-set of the control structures included in principle by the language. This makes it possible to satisfy precisely defined rules. Alternatively or additionally, additional information, for example a reference between program rows and a block of the block diagram, may be generated and incorporated into the source code in particular in the form of comments in order to improve the legibility of the source code and/or simplify debugging.

During or after code generation, information on the current block diagram or results of the code generation, for example warnings, may be stored in the definition data pool. This information may be used, for example, to influence compiling of the generated source code, or to provide meta information for other tools, for example calibration information in ASAP2 format or information for generating an intermediate layer in accordance with the AUTOSAR standard. In alternative embodiments of the invention, code in a hardware description language or a configuration of a programmable hardware component may be generated from the block diagram.

Example embodiments of the invention will be explained below on the basis of segments of block diagrams.

Figure 4:
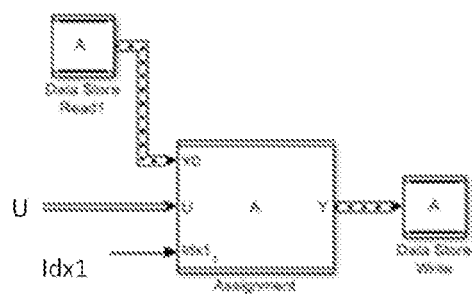
FIG. 4 shows a segment of a block diagram with dynamic assignment.

FIG. 4 shows a segment of a block diagram with dynamic assignment. The segment includes a Data Store Read block, which reads from a data store A, an assignment block, and a Data Store Write block, which writes to the data store A. As input signals, the assignment block receives the vectorial value read from the data store A, an index Idx1, and a scalar replacement value U. Once the previous value of A has been replaced with the replacement value U at the site Idx1, the assignment block outputs the resulting signal to the Data Store Write block.

For this segment, the following code was generated in a direct implementation without optimization:

```
for (Aux_S32=0; Aux_S32<20; Aux_S32++) {
    Sa1_Data_Store_Read1[Aux_S32]=A[Aux_S32];
}
for (Aux_S32=0; Aux_S32<20; Aux_S32++) {
    Sa1_Assignment[Aux_S32]=
Sa1_Data_Store_Read1[Aux_S32];
}
Sa1_Assignment[Idx1]=U;
for (Aux_S32=0; Aux_S32<20; Aux_S32++) {
    A[Aux_S32]=Sa1_Assignment[Aux_S32];
}
```

An optimal optimization would lead to the following code:
    A[Idx1]=U;
Compared with the non-optimized code, therefore, the buffer variables Sa1_Assignment and Sa1_Data_Store_Read1 have been eliminated.

In a method according to the invention, the following output conditions are identified:
    equal assignment in the block code pattern of the Data Store Read block equal assignment at the input of the assignment block equal assignment in the block code pattern of the Data Store Write block no multiple modification to the data store variable no reading/writing order conflicts between the Data Store Read and/or Write blocks As a result, Sa1_Data_Store_Read1 can be replaced with the A' of the Data Store Memory at the output of the Data Store Read block; here and in the following, inverted commas appended to an identifier indicate whether said identifier relates to the left-hand block, or upstream block in the signal flow (marked with an inverted comma), or to the right-hand block, or downstream block in the signal flow (marked with two inverted commas). In addition, Sa1_Assignment can be replaced with the A" of the subsequent Data Store Write block at the output of the assignment block.

This results in:

for (Aux_S32=0; Aux_S32<20; Aux_S32++) {
   A'[Aux_S32]=A[Aux_S32];
}
for (Aux_S32=0; Aux_S32<20; Aux_S32++) {
   A"[Aux_S32]=A'[Aux_S32];
}
A"[Idx1]=U;
for (Aux_S32=0; Aux_S32<20; Aux_S32++) {
   A[Aux_S32]=A"[Aux_S32];
} as possible initial code (for better legibility, the explanation is based on C source code even though the optimization actually takes place before the translation into source code). Here and in the following, the inverted commas are used only to illustrate the reference to one of the blocks and do not change the fact this always relates to the same identifier.

According to the invention, transforming the block diagram into the intermediate representation comprises removing any assignments in which a reference to the same variable exists on both sides (as explained above, none of the grounds of exclusion is satisfied).

As a result, the three "A [Aux_S32]=A [Aux_S32]" assignments together with the surrounding loops are not even applied, i.e., the immediate result is:

A"[Idx1]=U;

The method according to an embodiment of the invention thus provides the following advantage: unnecessary statements and variables are not even generated, so efficient code is immediately generated and obviously unnecessary variables and statements need not go through the further optimization steps or code generation at all.

The block diagram segment shown in FIG. 4 models reading from a data store variable, changing the value of a portion of the variables, and writing at least the changed portion of the variables to the same data store. However, even if the value of the variables is written to a different data store variable, efficient source code can be generated using the method according to an embodiment of the invention. Therefore, if the data store variable of the Data Store Write block were different, for example B, then B" would feature in the initial code in each case instead of A". In this case, the two inverted commas indicate that the identifier relates to the right-hand block. Without any optimization, the following code is initially obtained:

for (Aux_S32=0; Aux_S32<20; Aux_S32++) {
   A'[Aux_S32]=A[Aux_S32];
}
for (Aux_S32=0; Aux_S32<20; Aux_S32++) {
   B"[Aux_S32]=A'[Aux_S32];
}
B"[Idx1]=U;
for (Aux_S32=0; Aux_S32<20; Aux_S32++) {
   B[Aux_S32]=B"[Aux_S32];
}

Owing to the removal according to the invention of any assignments in which a reference to the same variable exists on both sides, i.e., while omitting the unnecessary identical copying operations, the following code is obtained:

for (Aux_S32=0; Aux_S32<20; Aux_S32++) {
   B"[Aux_S32]=A'[Aux_S32];
}
B"[Idx1]=U;

Without any further information, this is the optimum code pattern. Advantageously, in the method according to an embodiment of the invention for generating source code, all three blocks need not be analyzed together but rather observing block pairs is sufficient. In the present case, therefore, the following two parts are observed:

1. Does the Data Store Read block output subsequently have no signal line branching or a clear, data-flow-driven order compared with any Data Store Write blocks for all the children? If so, the dedicated block output variable can be replaced with the portion of the Data Store Memory variable that was selected for the dynamic assignment.

2. Does the block output variable of the parent block of the Data Store Write input have the same properties as the selected portion of the Data Store Memory variable, and are there no signal line branches? If so, the block output variable of the parent block can be replaced with the selected portion of the Data Store Memory variable.

Figure 5:
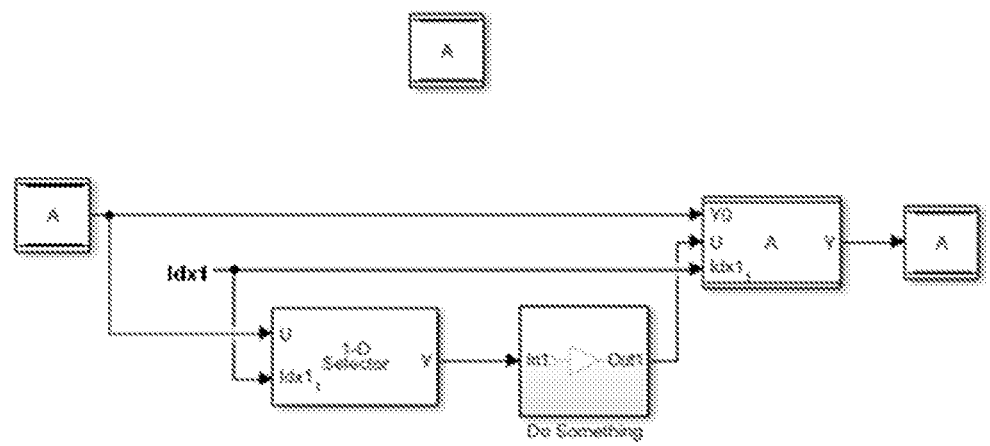
FIG. 5 shows a segment of a block diagram with a read-modify-update mechanism.

FIG. 5 shows a segment of a block diagram with a read-modify-update mechanism. The segment includes a Data Store Read block, which reads from a data store A, a selector block, a calculation block, an assignment block, and a Data Store Write block, which writes to the data store A. As input signals, the selector block receives the vectorial value read from the data store A and an index Idx, and as the output it delivers, to the downstream calculation block, the value of the input vector element found at the site Idx1. The Do Something calculation block is configured as a hierarchical block and can apply any operations before the result is output to the assignment block as a scalar replacement value. In addition to the scalar replacement value U, as input signals the assignment block receives the vectorial value read from the data store A and the index Idx1. Once the previous value of A has been replaced with the replacement value U at the site Idx1, the assignment block outputs the resulting signal to the Data Store Write block.

In this case, the significant point compared with the previous example is the branch to the selector block. The Data Store Read block output variable buffers the Data Store Memory value at the time when reading takes place. If the code of the selector block or, in the case of static selection, of a child of the selector block is potentially executed after the Data Store Write or its parent block, then the Data Store Read block output cannot be eliminated. If Do Something is a chain of blocks that also drive the U-input of the assignment block, or if Do Something is an atomic system, then the correct order of execution of the blocks is guaranteed and the block variables can be replaced. This results in the following source code:

```
for (Aux_S32=0; Aux_S32<20; Aux_S32++) {
    A'[Aux_S32]=A[Aux_S32];
}
Sa1_Selector=A'[Idx1]; /* Output variable of the selector
    block */
.../* Do Something calculates U and reads Sa1_Selector
    */
for (Aux_S32=0; Aux_S32<20; Aux_S32++) {
    A"[Aux_S32]=A'[Aux_S32];
}
A"[Idx1]=U;
for (Aux_S32=0; Aux_S32<20; Aux_S32++) {
    A[Aux_S32]=A'[Aux_S32];
}
```

Once superfluous assignments have been removed, the following is thus obtained:

```
Sa1_Selector=A'[Idx1]; /* Output variable of the selector
    block */
.../* Do Something calculates U and reads Sa1_Selector
    */
A"[Idx1]=U;
```

By checking and, where applicable, adapting the block order of execution, optimized source code can thus be generated even in a branch in the signal flow.

Figure 6:
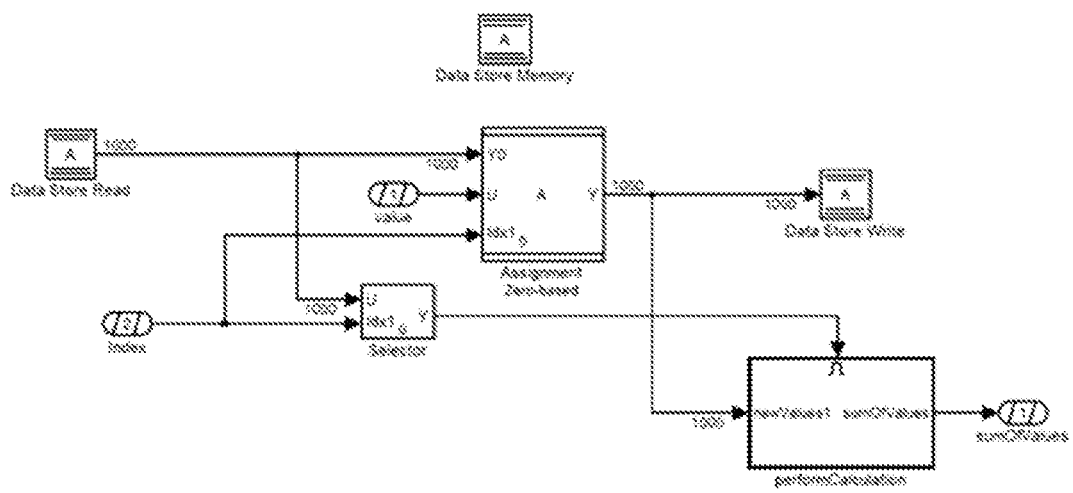
FIG. 6 shows a segment of a block diagram with a read-update-use mechanism.

FIG. 6 shows a segment of a block diagram with a read-update-use mechanism, which combines reading of a data store variable, changing the value, and writing-back a portion of the variables with a calculation based on the changed variables. The segment includes a Data Store Read block, which reads from a Data Store Memory A, an assignment block, and a Data Store Write block, which writes to the data store A. In addition to the scalar replacement value U, as input signals the assignment block receives the vectorial value read from the data store A and the index Idx1. Once the previous value of A has been replaced with the replacement value U at the site Idx1, the assignment block outputs the resulting signal to the Data Store Write block and a calculation block performCalculation. The output signal of the Data Store Read block is additionally linked to a selector block, which receives, as input signals, the vectorial value read from the data store A and an index Idx1, and delivers, as the output signal, the value of the input vector element found at the site Idx1. This output signal is linked to the trigger input of the calculation block performCalculation, which can apply any operations to the updated value of the data store variables before the result is output to an output port sumOfValues.

In this case, the decisive difference from the previous situation is that it is not ensured that the selector block is executed before the Data Store Write block. According to the state of the art, the following code is typically generated during code generation:

```
for (Aux_S32=0; Aux_S32<20; Aux_S32++) {
    Sa1_Data_Store_Read[Aux_S32]=A[Aux_S32];
}
for (Aux_S32=0; Aux_S32<20; Aux_S32++) {
    Sa1_Assignment[Aux_S32]=Sa1_Data_Store_Read
        [Aux_S32];
}
Sa1_Assignment[index]=value;
for (Aux_S32=0; Aux_S32<20; Aux_S32++) {
    A[Aux_S32]=Sa1_Assignment[Aux_S32];
}
Sa1_Selector=Sa1_Data_Store_Read1[index];        if
    (Sa1_Selector) {
    sumOfValues=performCalculation(Sa1_Assignment);
}
```

As a result, an optimization may no longer be based on the intermediate representation and the block output variable Sa1_Data_Store_Read is unnecessarily left over.

Optimized code for the block pair composed of the Data Store Read block and the selector block may be generated when the order of calculation of the blocks is ensured, i.e., the selector block is always executed before the Data Store Write block. According to a preferred embodiment of the invention, the production code generator in this case expediently checks whether the executions of the assignment block and selector block can be freely shifted with respect to one another, and if so it determines a virtual data flow dependency between the selector block and the assignment block (as the parent block of the Data Store Write block). This forces a suitable order of execution of the blocks or ensures that the selector block is executed in a timely manner.

In addition, the block pair composed of the assignment block and the Data Store Write block may be optimized only when no Data Store Read block or, where the Data Store Read block output variable is eliminated, Data Store Read child block is executed after the assignment block. Only then may the assignment block, as the parent of the Data Store Write block, receive the Data Store Memory variable as an output variable, or only then can the output variable of the assignment block be removed.

Signal line branches thus make it necessary to check more than two blocks in order to ensure the allowability of the optimization according to an embodiment of the invention. This also applies when a plurality of Data Store Read and Write blocks access the same Data Store Memory block.

If the required order of execution of the blocks linked in the signal flow is adhered to, the following code is produced:

```
for (Aux_S32=0; Aux_S32<20; Aux_S32++) {
    A'[Aux_S32]=A[Aux_S32];
}
Sa1_Selector=A'[index];
for (Aux_S32=0; Aux_S32<20; Aux_S32++) {
    A"[Aux_S32]=A'[Aux_S32];
}
A"[index]=value;
for (Aux_S32=0; Aux_S32<20; Aux_S32++) {
    A[Aux_S32]=A"[Aux_S32];
}
if (Sa1_Selector) {
    sumOfValues=performCalculation(A");
}
```

Once superfluous assignments of a variable to itself have been removed, the following is obtained:

```
Sa1_Selector=A'[index];
A"[index]=value;
if (Sa1_Selector) {
    sumOfValues=performCalculation(A");
}
```

Figure 7:
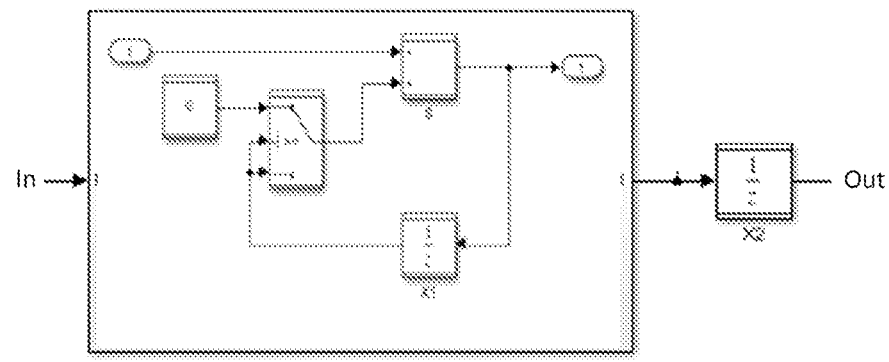
FIG. 7 shows a segment of a block diagram with parallel and feedback-based delay states.

FIG. 7 shows a segment of a block diagram with parallel and feedback-based states of delay blocks, which delay a signal by one time step. A sub-system receives an input signal In. The input signal reaches a summation block S, the output of which is linked to an output port and to a first delay block having the state X1. The output of the delay block is linked to a first input of a selector block, which also receives, and alternatively can output, a constant. The output of the selector block forms a second input of the summation block S. The output signal Out of the sub-system is linked to a second unit delay block, which has a state X2. By way of example, modeling of this kind with similar delay blocks occurs when library blocks of a block library are used.

Unless atomic system boundaries force other update orders of the two states, or other initial values are specified, X1 and X2 may receive the same state variable:

```
.../* Use X1 */
S=...;
.../* Use X2 */
.../* Use S */
X1=S;
...
X2=S;
```

This results in the following code (the unnecessary duplicate definition later being removed by the optimization):

```
.../* Use X1 */
S=...;
.../* Use X1 */
.../* Use S */
       X1 = S;
...
x1=S;
```

If there are no parallel states available that can be optimized in this way, then for feedback-based delays it is possible to replace the preceding block output variable. If the sub-system displayed is thus atomic, the following is obtained for Sa2_Out1 as the block output variable of the sub-system:

```
.../* Use X1 */
S=...;
Sa2_Out1=S;
X1=S;
.../* Use X2 */
.../* Use Sa2_Out1 */
...
X2=Sa2_Out1;
```

In the event of an optimization of equal assignments in accordance with the invention, the following code is produced:

```
.../* Use X1 */
X1=...;
Sa2_Out1=X1;      X1 = X1;
.../* Use X2 */
.../* Use Sa2_Out1 */
...
X2=Sa2_Out1;
```

If the atomic system is a conditionally configured subsystem, then the outputs obtain initial values and can assume the role of a state in the generated serial code for a static storage duration. Thus, if a state has the same initial value as X1, then it is a parallel state, as with X2 in the case without a conditional configuration. In other words, in this case too the state can be replaced with the output of the atomic system if the initial values are the same:

```
.../* Use Sa2_Out1 */
Sa2_Out1=...;
       Sa2_Out1 = Sa2_Out1;
       Sa2_Out1 = Sa2_Out1;
.../* Use X2 */
.../* Use Sa2_Out1 */
...
X2=Sa2_Out1;
```

In this case, unless the system is not a conditionally configured system or the user has preset a specification for the system output, and provided that the unit delay state has sufficient visibility, it is more advantageous in this case to swap the order around, i.e., to replace the block output with the system output first (regardless of whether and how it was initialized) in order to circumvent the condition of identical initialization:

```
.../* Use X1 */
X1=...;
       X1 = X1;
       X1 = X1;
.../* Use X2 */
.../* Use X1 */
...
X2=X1;
```

Figure 8:
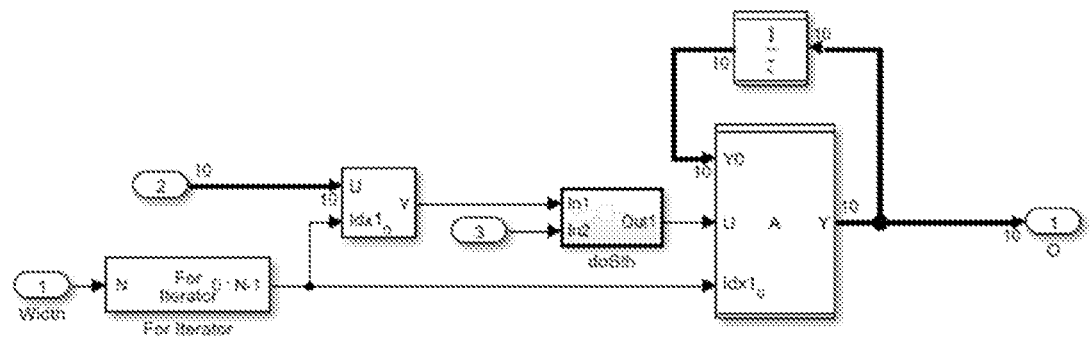
FIG. 8 shows a segment of a block diagram with an iterated system.

FIG. 8 shows a segment of a block diagram showing an iterated system. In some circumstances in iterated systems, for non-scalar signals internal loops occur which adversely affect the performance, particularly when constructing a vector or a matrix via an assignment block. The processing of vectorial signals is shown. A For Iterator block receives a signal width via a first input port, which signal width specifies the number of iterations, i.e., how often the For Iterator block has linked blocks executed during a time step. The output of the For Iterator block is linked to an index input Idx1 of a selector block and of an assignment block A. The selector block selects an element of a vectorial input signal received at a second input port and relays it to a processing block doSth, which is additionally linked to a third input port. The output signal Out1 of the processing block doSth is fed to the assignment block A as a new value U. The output of the assignment block is both fed back via a delay block as a vector Y0 to be changed and also output via an output port O.

Code generation for the block diagram segment shown having the feedback-based delay block produces the following:

```
Sa2_Assignment_FirstRun=1;
for (iterator=0; iterator<=9; iterator++) {
    Sa2_Selector=in2[iterator];
    U=doSth(Sa2_Selector, in3);
    if (Sa2_Assignment_FirstRun) {
        for (Aux_S32=0; Aux_S32<10; Aux_S32++) {
            Sa2 Assignment[Aux_S32]=X_Sa2_UnitDelay
                [Aux_S32];
        }
        Sa2 Assignment_FirstRun=0;
    }
    Sa2 Assignment[iterator]=U;
    for (Aux_S32=0; Aux_S32<10; Aux_S32++) {
        X_Sa2_UnitDelay[Aux_S32]=Sa2_Assignment
            [Aux_S32];
    }
}
```

The optimization results in the following code (like elsewhere, superfluous code to be removed later is shown in strike-through):

```
Sa2_Assignment_FirstRun=1;
for (iterator=0; iterator<=9; iterator++) {
    Sa2_Selector=in2[iterator];
    U=doSth(Sa2_Selector, in3);
    if (Sa2_Assignment_FirstRun) {
            for (Aux_S32 = 0;
        Aux_S32 < 10; Aux_S32++) {
            X_Sa2_UnitDelay
        [Aux_S32] =
        X_Sa2_UnitDelay[Aux_S32];
        }
        Sa2_Assignment_FirstRun=0;
```

}
X_Sa2_UnitDelay[iterator]=U;
}

Owing to the optimization according to an embodiment of the invention, therefore, the internal loops that the usual methods find more difficult to optimize are omitted.

Figure 9:
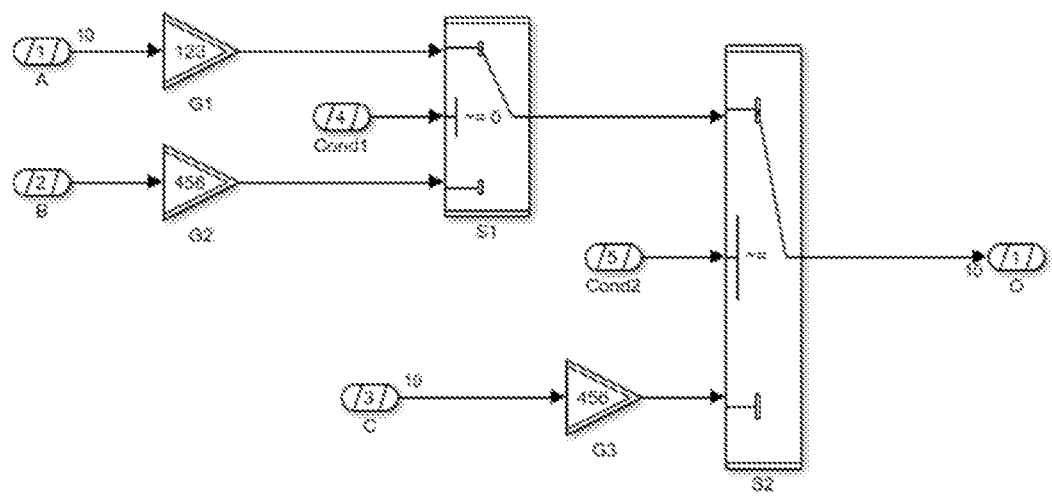
FIG. 9 shows a segment of a block diagram with switch blocks.

FIG. 9 shows a segment of a block diagram using switch blocks. Via a first input port A, a vectorial input signal is received and fed to a gain block G1, which multiplies the values by a factor 123. Via a second input port B, a scalar signal is received and fed to a gain block G2, which multiplies the value by a factor 456. The output signals of the two gain blocks are fed to a switch block S1, which selects Cond1 according to a value at the input port, which signal is relayed. The output of the switch block S1 is linked to the first input of a second switch block S2. Via an input port C, a further vectorial input signal is received and fed to a third gain block G3, which multiplies the values by a factor 456 and outputs them at the second input of the switch block S2. On the basis of a further input port Cond2, the second switch block S2 switches between the output of the first switch block S1 and the output of the third gain block G3. The conducted signal is output via the output port O.

If the production code generator shifts block-diagram-based parent blocks from switch blocks or multi-port switch blocks into the control flow branch of a data input, the block outputs of the direct parents are each directly copied to the block output variable of the switch or multi-port switch blocks. In this case, they can be replaced with the switch output.

```
if (Cond2) {
  if (Cond1) {
    for (Aux_S32=0; Aux_S32<10; Aux_S32++) {
      G1[Aux_S32]=123 * A[Aux_S32];
    }
    for (Aux_S32=0; Aux_S32<10; Aux_S32++) {
      S1[Aux_S32]=G1[Aux_S32];
    }
  } else {
    G2=456 * B;
    for (Aux_S32=0; Aux_S32<10; Aux_S32++) {
      S1[Aux_S32]=G2;
    }
  }
  for (Aux_S32=0; Aux_S32<10; Aux_S32++) {
    S2[Aux_S32]=S1[Aux_S32];
  }
} else {
  for (Aux_S32=0; Aux_S32<10; Aux_S32++) {
    G3[Aux_S32]=456 * C[Aux_S32];
  }
  for (Aux_S32=0; Aux_S32<10; Aux_S32++) {
    S2[Aux_S32]=G3[Aux_S32];
  }
}
for (Aux_S32=0; Aux_S32<10; Aux_S32++) {
  O[Aux_S32]=S2[Aux_S32];
}
```

In this case, when applied to S2 and S1 and the previous back-copy of the output O, the following is produced:

```
if (Cond2) {
  if (Cond1) {
    for (Aux_S32=0; Aux_S32<10; Aux_S32++) {
      O'[Aux_S32]=123 * A[Aux_S32];
    }
  } else {
    G2=456 * B;
    for (Aux_S32=0; Aux_S32<10; Aux_S32++) {
      O"[Aux_S32]=G2;
    }
  }
} else {
  for (Aux_S32=0; Aux_S32<10; Aux_S32++) {
    O""[Aux_S32]=456 * C[Aux_S32];
  }
}
```

In this case, O' denotes a replaced reference from the block pair comprising G1, O" denotes a replaced reference from the block pair comprising S1, O'" denotes a replaced reference from the block pair comprising S2, and O"" denotes a replaced reference from the block pair comprising G3. Because an exclusion criterion is satisfied, namely that the signals have different widths, G2 cannot be optimized.

The method according to an embodiment of the invention allows for significant reductions in storage requirements and the execution time otherwise required for copying, particularly when using multi-component variables having high memory consumption, as occur, for example, when modeling buses.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for generating source code from one or more blocks of a block diagram that comprises at least two non-virtual blocks and at least one signal link between two non-virtual blocks, wherein the method comprises:
    transforming the block diagram into an intermediate representation, wherein transforming the block diagram into the intermediate representation comprises transforming a first block having access to a multi-component variable;
    successively optimizing the intermediate representation; and
    translating the optimized intermediate representation into source code;
    wherein transforming the first block comprises:
        testing whether a block pair made up of the first block and an adjacent block comprises an equal assignment, wherein the block pair is composed of either the first block and its parent or the first block and its child, wherein an equal assignment is present when a portion of the multi-component variable of one block of the block pair is copied in unchanged form into one portion of the multi-component variable of the other block of the block pair, and wherein either a reference to a portion of an output variable of the first block is replaced with a reference to a corresponding portion of a data store variable, or a reference to a portion of an output variable of the parent block of the first block is replaced with a reference to a corresponding portion of a variable of the first block; and
        removing any assignments in which a reference to the same variable exists on both sides.

2. The method according to claim 1, wherein one or more of the following block types are tested for an equal assignment:
    a Data Store Read block;
    a Data Store Write block;
    a switch block, which selectively links an output to one of a plurality of inputs;
    a bus outport block, which models a readout to a bus;
    an outport block, which models a readout; and/or
    a delay block, which outputs an input signal again after a delay of one time step;
    wherein:
        in the case of the first block being a Data Store Read block, the first block is considered together with its child block, and based on an equal assignment being present, the reference to the portion of the output variable of the first block is replaced with the reference to the corresponding portion of the data store variable; and/or,
        in the case of the first block being a Data Store Write block, switch block, bus outport block, outport block, and/or delay block, the first block is considered together with its parent block, and based on an equal assignment being present, the reference to the portion of the output variable of the parent block of the first block is replaced with the reference to the corresponding portion of the variable of the first block.

3. The method according to claim 1, wherein a block diagram comprises a multiplicity of blocks whose block type corresponds to a block type that is to be tested for an equal assignment; and
    wherein, for each block of the multiplicity of blocks, a test for an equal assignment is performed depending on the block type, and variable references are replaced based on an equal assignment being present.

4. The method according to claim 1, wherein the multi-component variable is a vector comprising a multiplicity of variables of the same data type, a matrix comprising a multiplicity of vectors, a structure comprising a multiplicity of variables of any data type, or a vector of structures.

5. The method according to claim 1, wherein block diagrams are defined hierarchically, wherein a block in a higher plane may comprise a plurality of blocks of a subordinate plane, wherein blocks of a subordinate plane are allocated to a block of a higher plane; and
    wherein, when a Data Store Read block is tested for an equal assignment, Data Store Write blocks that access the same data store variable are sought in an extensive hierarchical block, in particular an atomic hierarchical block.

6. The method according to claim 5, wherein, based on a Data Store Read block and a Data Store Write block having access to the same data store variable having been found in the extensive hierarchical block, a check is carried out as to whether the Data Store Read block and the Data Store Write block are linked at least in part in the signal flow such that the portion of the data store variables that is read in the Data Store Read block has a non-empty intersection with the portion of the data store variables that is written in the Data Store Write block, wherein at least one block is located in the signal flow between the Data Store Read block and the Data Store Write block, wherein the interjacent block(s) comprise (s) at least one non-virtual processing block that processes an input variable in order to generate an output variable; and
    wherein, as an additional condition, a check is carried out as to whether the interjacent block(s) exhibit(s) such an order of execution that the at least one processing block is executed before the Data Store Write block, and based on this additional condition being met, the fraction of the Data Store Read block output variables corresponding to the intersection is replaced with the fraction of the data store variables that corresponds to the intersection.

7. The method according to claim 6, wherein based on the additional condition initially not being met, the order of execution of at least one of the interjacent blocks is changed so as to meet the additional condition.

8. The method according to claim 5, wherein based on a Data Store Read block and a Data Store Write block having access to the same data store variable having been found in the extensive hierarchical block, a check is carried out as to whether the Data Store Read block and the Data Store Write block are linked at least in part in the signal flow such that the portion of the data store variables that is read in the Data Store Read block has a non-empty intersection with the portion of the data store variables that is written in the Data Store Write block, wherein at least one block is located in the signal flow between the Data Store Read block and the Data Store Write block, wherein the interjacent block(s) comprise (s) at least one non-virtual processing block that processes an input variable in order to generate an output variable; and wherein, in this case, as additional conditions for a parent block of the Data Store Write block, namely the processing block closest to the Data Store Write block in the signal flow, a check is carried out as to whether the fraction of the block output of the parent block corresponding to the intersection is linked to the Data Store Write block without any signal flow branching, and as to whether the block output variable of the parent block coincides, in terms of dimension and data type, with the at least partial link in the signal flow, wherein, based on these additional conditions being met, the block output variable of the parent block is replaced with the fraction of the data store variables that corresponds to the intersection.

9. The method according to claim 1, wherein block diagrams are defined hierarchically, wherein a block in a higher plane may comprise a plurality of blocks of a subordinate plane, wherein blocks of a subordinate plane are allocated to a block of a higher plane;

wherein, when a first Data Store Write block is tested for an equal assignment, further Data Store Write blocks that access the same data store variable are sought in an extensive hierarchical block, in particular an atomic hierarchical block; and wherein, as a ground of exclusion for replacing references to variables in the block pair of the first Data Store Write block, a check is carried out for each further Data Store Write block found as to whether it writes to a portion of the data store variables that is also described by the first Data Store Write block, wherein, based on the ground of exclusion being satisfied, a reference to the output variable of the parent block is not replaced with a reference to the portion of the data store variables that is described by the first Data Store Write block, despite an equal assignment being present.

10. The method according to claim 1, wherein variables can be specified as states, wherein, even if an equal assignment is present between a first variable and a second variable of a block pair, a reference to the first variable is replaced with a reference to the second variable only in case that the first variable is not specified as a state and/or the second variable is specified as a state.

11. The method according to claim 1, wherein, despite an equal assignment being present between a first variable and a second variable of a block pair, a reference to the first variable is not replaced with a reference to the second variable in case that one or more of the following grounds of exclusion are satisfied:

the first and second variables have a different dimension;
at least one element in the first variables has a different data type from the corresponding element in the second variables;
the first variable is specified as being necessary;
there is an unpredictable data flow due to signal flow branching and/or the order of execution of the linked blocks;
wherein, in the event that there is an equal assignment only for fractions of the first and second variables, only said fractions are also considered in the grounds of exclusion.

12. The method according to claim 11, wherein block diagrams are defined hierarchically, wherein a block in a higher plane may comprise a plurality of blocks of a subordinate plane, wherein blocks of a subordinate plane are allocated to a block of a higher plane, and wherein all the blocks in the plane of the first block and all the blocks allocated to those blocks are checked as to whether a ground of exclusion is satisfied.

13. A method for configuring a control unit, wherein the control unit comprises at least one arithmetic logic unit, the method comprising:

inputting a block diagram comprising at least two non-virtual blocks and at least one signal link between two non-virtual blocks;
generating source code from one or more blocks of the block diagram by:
transforming the block diagram into an intermediate representation, wherein transforming the block diagram into the intermediate representation comprises transforming a first block having access to a multi-component variable;
successively optimizing the intermediate representation; and
translating the optimized intermediate representation into the source code;
wherein transforming the first block comprises:
testing whether a block pair made up of the first block and an adjacent block comprises an equal assignment, wherein the block pair is composed of either the first block and its parent or the first block and its child, wherein an equal assignment is present when a portion of the multi-component variable of one block of the block pair is copied in unchanged form into one portion of the multi-component variable of the other block of the block pair, and wherein either a reference to a portion of an output variable of the first block is replaced with a reference to a corresponding portion of a data store variable, or a reference to a portion of an output variable of the parent block of the first block is replaced with a reference to a corresponding portion of a variable of the first block; and
removing any assignments in which a reference to the same variable exists on both sides;
compiling the source code for the at least one arithmetic logic unit such that an executable code is generated;
transmitting the executable code to the control unit; and
storing the executable code on a non-volatile memory of the control unit and/or executing the executable code by the at least one arithmetic logic unit of the control unit.

14. A non-transitory computer-readable medium having processor-executable instructions stored thereon for generating source code from one or more blocks of a block diagram that comprises at least two non-virtual blocks and at least one signal link between two non-virtual blocks, wherein the processor-executable instructions, when executed, facilitate:

transforming the block diagram into an intermediate representation, wherein transforming the block diagram into the intermediate representation comprises transforming a first block having access to a multi-component variable;
successively optimizing the intermediate representation; and
translating the optimized intermediate representation into source code;

wherein transforming the first block comprises:
- testing whether a block pair made up of the first block and an adjacent block comprises an equal assignment, wherein the block pair is composed of either the first block and its parent or the first block and its child, wherein an equal assignment is present when a portion of the multi-component variable of one block of the block pair is copied in unchanged form into one portion of the multi-component variable of the other block of the block pair, and wherein either a reference to a portion of an output variable of the first block is replaced with a reference to a corresponding portion of a data store variable, or a reference to a portion of an output variable of the parent block of the first block is replaced with a reference to a corresponding portion of a variable of the first block; and
- removing any assignments in which a reference to the same variable exists on both sides.

* * * * *